United States Patent
Schotten et al.

[15] 3,655,056
[45] Apr. 11, 1972

[54] FILTER ELEMENT FOR UPRIGHT FILTER PRESS

[72] Inventors: Alfons Schotten; Franz Heimbach, both of Dueren, Germany

[73] Assignee: Eberhard Hoesch & Sohne, Duren, Germany

[22] Filed: Apr. 23, 1970

[21] Appl. No.: 31,288

[30] Foreign Application Priority Data

Dec. 8, 1969 Germany.....................G 69 47 461.9

[52] U.S. Cl. ............................................................210/227
[51] Int. Cl. ...........................................................B01d 25/00
[58] Field of Search ..........................210/224, 231, 225–230

[56] References Cited

UNITED STATES PATENTS

| 2,253,437 | 8/1941 | Leimer | 210/224 |
| 3,363,768 | 1/1968 | Mecky et al. | 210/224 |
| 1,052,958 | 2/1913 | Rabenstein | 210/224 |

FOREIGN PATENTS OR APPLICATIONS 642,380  12/1959  Italy.......................................210/231

Primary Examiner—Reuben Friedman
Assistant Examiner—T. A. Granger
Attorney—Michael S. Striker

[57] ABSTRACT

In an upright filter press filter elements are arranged in stacked superimposed relationship. Each filter element has a frame having an upper side and a lower side and carrying filter means. A liquid-conveying channel is provided in each frame and terminates at a lateral side thereof for conveying expressed liquid. A lateral tubular extension is provided on each frame having a lower portion protruding downwardly beyond the lower side and a passage oriented in upright direction and communicating with the channel. The passage has at the upper side of the frame an inlet whose inner diameter is larger than the outer diameter of the lower portion so that the lower portion of the extension on the respectively upper filter element is telescopically receivable in the inlet of the passage of the extension of the respectively lower filter element.

9 Claims, 1 Drawing Figure

PATENTED APR 11 1972            3,655,056
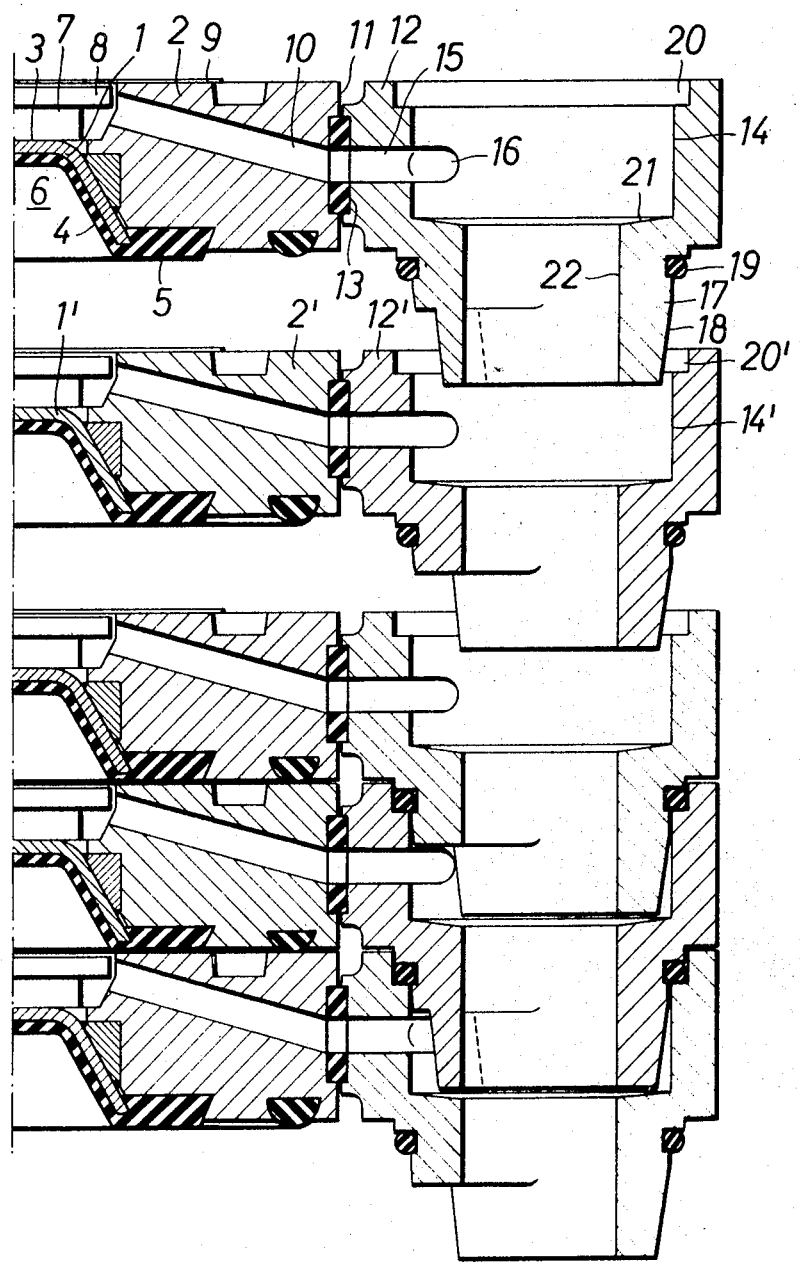
INVENTOR
ALFONS SCHOTTEN
FRANZ HEINBACH
BY

FILTER ELEMENT FOR UPRIGHT FILTER PRESS

BACKGROUND OF THE INVENTION

The present invention relates generally to filter presses, and more particularly to upright filter presses. Still more specifically the invention relates to filter elements for upright filter presses.

In upright filter presses using filter plates a stack of such plates or elements is arranged in superimposed relationship. When the press is to be opened, that is subsequent to expressing of liquid from a charge and for removal of the filter cake or residue, the superimposed plates are vertically moved away from one another so that all plates or filter elements have an identical spacing of such magnitude as to permit removal of the residue and/or of the filter material, as well as cleaning of the press if necessary. Conventionally, filter presses of this type provide for evacuation of the expressed liquid from each filter plate or filter element by means of a bore provided in the frame of the filter plate which laterally terminates in an upright channel, having a slight downgrade towards the latter. When the filter plates are in superimposed but abutting relationship, that is when the press is closed, the vertical channels of the individual filter plates are vertically aligned with one another and seals are provided between the adjacent filter plates so that expressed liquid from all of the various filter plates passes through the respective inclined bores into the composite upright channel constituted by the individual channels in the various frames and can flow off without losses.

When such a press is opened, it is usual that a residual flow of expressed liquid continues. Not only will there be the normal amount of dripping, but also it is well known that in the regions of each filter plate which are remote from the bore some filtrate almost invariably collects which enters into the bore only as a result of the movement of the filter plates caused by opening of the press, or as a result of the concomitant changes in the orientation of the filter plates. Of course, with the filter plates out of abutment there is no longer any seal between the individual upright channels which together constitute the composite channel through which the expressed liquid flows off when the press is closed. As a result of this the residual liquid flow may be lost, by dripping down over the press, the supports, by running laterally between juxtaposed but now spaced filter elements or in other manner. In any case, not only will the liquid very likely be lost which is particularly undesirable if the filtrate is valuable, but also the possibility exists that the liquid itself may be of such nature as to cause damage to portions of the press which it can contact but is not normally intended to contact, and to cause the danger of bodily harm to the operator and of damage to the garments worn by the operator. At the very least, that is if the expressed liquid is not actually of such nature as to present a danger, it will cause contamination of the press and require cleaning of the latter.

SUMMARY OF THE INVENTION

It is, accordingly, an object of the present invention to overcome the aforementioned disadvantages.

More particularly it is an object of the present invention to provide, in an upright filter press, an arrangement which is not possessed of these problems.

In accordance with a further object of the invention the arrangement is to be simple but yet highly reliable.

In pursuance of the above objects, and others which will become apparent hereafter, one feature of the invention resides in the provision, in an upright filter press, of a combination which briefly stated comprises at least two superposed filter elements each having a normally horizontally oriented frame provided with an upper side and a lower side. Filter means is provided in each frame. A liquid-conveying channel is provided in each frame and terminates at a lateral side thereof for conveying expressed liquid. A lateral tubular extension is provided on each frame also and has a lower portion which projects downwardly beyond the lower side of the frame, such extension having a passage oriented in upright direction and communicating with the channel of the respective frame, and the passage having at the upper side of the frame an inlet whose inner diameter is larger than the outer diameter of the lower portion whereby the lower portion of the extension on the upper of the filter elements is telescopically receivable in the inlet of the passage in the extension of the lower of the filter elements.

Of course, the invention is applicable not only to two superimposed filter elements of the type just outlined, but also more of them. It is advantageous but not a requisite of the invention that the length of the lateral extension on each filter element be such that the lower portion of the uppermost extension still extend into the inlet of the extension of the respectively lower filter element when the filter elements are spaced vertically from one another, that is when the press is open. Also, it is advantageous, although not necessary, that the lateral tubular extensions be constructed as separate elements which are releasably connected with the respective filter element frames. Of course, such connections must be fluid-tight, for instance by providing a suitable seal. Such a construction makes the manufacture of the individual filter elements simpler, a consideration which is also true of the manufacture of the tubular extensions themselves, and by making the tubular extensions releasably and adjustably connected with the respective frames it is also possible to adjust them more specifically with reference to the tubular extensions on the respectively superimposed and subjacent filter elements.

It is further advantageous to provide a seal—which in conventional manner is located between any two superimposed filter elements—in such a manner that it is arranged in a step provided in the outer circumferential surface of each tubular extension, the step being located at the juncture between the portion of the respective extension which has the inlet of larger diameter and the lower portion of the same extension which is intended to extend into the inlet of the extension on the subjacent filter element. In this connection it is also pointed out that it is also advantageous to have at least the lower portion taper on its outer circumferential surface to facilitate introduction into the inlet of the respectively subjacent tubular extension. This also results in a savings in weight because with such a taper less material is involved. Finally, it is also advantageous to provide for means, still to be described in more detail, which permit the unhindered flow of liquid into the passage of each tubular extension from the respectively associated liquid-conveying channel, even when the lower portion of the tubular extension on the respectively superposed filter element is received in such passage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a vertical section in fragmentary illustration through a stack of superposed filter elements as they would be arranged in an upright filter press but with details of the latter omitted.

DESCRIPTION OF THE PREFERRED EMBODIMENTS

Discussing now the drawing in detail it is pointed out that while there are five filter elements 1 provided in the drawing, as few as two or more than five of them may be present in an upright filter press. The filter press itself has not been illustrated because it is conventional and does not form a part of the invention. It is also pointed out that the two upper filter elements 1 are shown in open position of the press whereas the three lower filter elements 1 are shown in the closed position of the press. Normally, of course, all of the filter elements will either be in open position or in closed position although there are special constructions of upright filter presses where it is possible to move only some of the stack of filter elements to open position. The differential showing in the drawing in the present application has been chosen to facilitate an understanding of the invention.

Each of the filter elements 1 comprises a frame 2 and a center plate 3 on which there is supported a press diaphragm 4 the edge 5 of which is interposed as a seal between two adjacent elements 1. The diaphragm 4 surrounds the raw-liquid chamber 6 while the filtrate chamber 7 is above the core or center plate 3 and covered at the top by a supporting inert 8 and a filter cloth 9. Filtrate passes from the filtrate chamber 7 through a downwardly inclined liquid-conveying channel 10 which opens approximately at the middle between the upper and lower sides of the respective frames 2 in a lateral upright outer surface 11 of the frame.

According to the invention, the lateral tubular extension 12 is secured on this surface 11 in a suitable manner, for instance by non-illustrated screws, and a seal is provided here illustrated as a sealing ring 13. According to the invention the respective tubular extensions 12 have a vertically oriented passage including an upper inlet portion 14 which is wider and into which a bore 15 opens which communicates with the liquid-conveying channel in the respective frame 2. The bore 15 terminates in a shallow trough-shaped portion 16. A lower or downward projection 17 is provided on each tubular extension 12 and is of substantially frustoconical configuration as indicated at 18. Its length is advantageously such that when the elements 1 are in the position they assume when the press is in open condition, as illustrated for purposes of better understanding by the upper two elements 1 in the drawing, the projection 17 will extend into the inlet portion 14' of the respectively subjacent tubular extension 12' of the subjacent frame 2'.

An O-ring seal or the like 19 is provided in the step between the larger-diameter portion 14 and the extension 17 and operates with a portion 20' of the subjacent tubular extension 12' to provide a seal between them when the elements 1 are in closed condition as evidenced by the lower three elements in the drawing. Of course, a different type of seal, such as a rope-like sealing element, can also be used for the element 19.

The surface connecting the enlarged passage portion 14 and the inner surface 22 in the passage of the projection 17 is of shallow frustoconical outline.

It has been mentioned before that means are advantageously provided to insure that the flow of liquid from the respective liquid-conveying channel of each frame into the passage portion 14 of the associated extension 12 is not hindered by the presence of the lower projecting portion 17 of the respectively superposed tubular extension. For this purpose the outer circumferential surface of each portion 17 may be provided in that region which will be juxtaposed with the outlet of the liquid-conveying channel of the subjacent frame 2 when the press is in closed condition (compare the three lower elements 1 in the drawing) with a recess as illustrated. In place of this recess, and in addition thereto, the inner circumferential surface in each enlarged passage portion 14 can also be provided with a part-circumferential groove into which the liquid-conveying channel discharges. The purpose in both cases is of course to ensure that there is no interference with the inflow of liquid.

It will be seen that with the construction according to the present invention the disadvantages present in the prior-art constructions and discussed in the introductory portions of this specification, have been avoided.

It will be understood that each of the elements described above or two or more together, ma also find a useful application in other types of construction differing from the types described above.

While the invention has been illustrated and described as embodied in filter elements for upright filter presses, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. In an upright filter press, in combination, at least two superposed filter elements each comprising a normally horizontally oriented frame having an upper side and a lower side, said filter elements being relatively movable between two positions in which they are vertically spaced by respectively smaller and larger distances; filter means in said frame; a liquid-conveying channel in said frame having an intake opening for receiving liquid which has filtered through said filter means and terminating at a lateral side of said frame for conveying filtered liquid; and a lateral tubular extension on said frame and having a lower projection projecting downwardly beyond the lower side thereof to an extent greater than said larger distance, said extension having a passage oriented in upright direction and communicating with said channel, and said passage having at said upper side of said frame an inlet whose inner diameter is larger than the outer diameter of said lower projection whereby said lower projection of the extension on the upper of said filter elements is telescopically received in the inlet of the passage in said extension of the lower of said filter elements in both of said two positions.

2. In a filter press as defined in claim 1, said extensions being discrete members each of which is fluid-tightly but releasably connected with the frame of the respective filter element.

3. In a filter press as defined in claim 2; further comprising connecting means connecting the respective extensions with the associated frame.

4. In a filter press as defined in claim 1; further comprising sealing means sealing the juncture between said extensions when the lower projection of one of the same is telescopically received in said passage of the other extension.

5. In a filter press as defined in claim 4, said extensions having an outer circumferential surface provided with a radial shoulder, and said sealing means being an annular sealing member surrounding each extension and abutting against said shoulder so as to be in sealing engagement with the same and the respective other extension when the same are telescoped.

6. In a filter press as defined in claim 1, said extensions having outer circumferential surfaces which at least in part conically converge in direction axially away from said inlet.

7. In a filter press as defined in claim 1, each of said extensions having an outer and an inner circumferential surface and a bore extending between them and communicating with the channel of the associated frame; and further comprising a recess on that portion of the respective outer surface which faces the bore of the respectively other extension when received in the same, so as to permit free entry of liquid through said bore into the associated passage.

8. In a filter press as defined in claim 7; further comprising a partially circumferentially extending groove provided in said inner circumferential surface and each communicating with the associated bore.

9. In a filter press as defined in claim 1; further comprising a sealing element between the respective extension and the associated frame for establishing a fluid-tight connection between the same.

* * * * *